US010273933B2

(12) United States Patent
Sabbadin (10) Patent No.: US 10,273,933 B2
(45) Date of Patent: Apr. 30, 2019

(54) WIND TURBINE BLADE ROOT AND PROCESS FOR MANUFACTURING A WIND TURBINE BLADE ROOT (71) Applicant: Windfin B.V., Leimuiden (NL)

(72) Inventor: Amedeo Sabbadin, Padua (IT)

(73) Assignee: WINDFIN B.V., Leimuiden (NL)

(*) Notice: Subject to any disclaimer, the term of this patent is extended or adjusted under 35 U.S.C. 154(b) by 711 days.

(21) Appl. No.: 14/779,634

(22) PCT Filed: Mar. 25, 2014

(86) PCT No.: PCT/IB2014/060142
§ 371 (c)(1),
(2) Date: Sep. 24, 2015

(87) PCT Pub. No.: WO2014/155293
PCT Pub. Date: Oct. 2, 2014

(65) Prior Publication Data
US 2016/0053741 A1 Feb. 25, 2016

(30) Foreign Application Priority Data
Mar. 25, 2013 (IT) .............................. MI2013A0449

(51) Int. Cl.
F03D 1/06 (2006.01)
B29D 99/00 (2010.01)
(Continued)

(52) U.S. Cl.
CPC ....... F03D 1/0675 (2013.01); B29D 99/0025 (2013.01); F03D 1/0658 (2013.01);
(Continued)

(58) Field of Classification Search
CPC .... F03D 1/0658; F03D 1/0633; F03D 1/0675; F03D 1/0691; F03D 13/10; F03D 13/20;
(Continued)

(56) References Cited
U.S. PATENT DOCUMENTS

2009/0160194 A1* 6/2009 Clark .................... F03D 1/0641
290/55

FOREIGN PATENT DOCUMENTS

EP 1633624 3/2006
EP 2453129 5/2012
(Continued)

OTHER PUBLICATIONS

Translation of WO 2012/111518 A1 courtesy of EspaceNet.*
International Search Report and Written Opinion for International Application No. PCT/IB2014/060142 dated Jun. 30, 2014.
(Continued)

Primary Examiner — Dwayne J White
Assistant Examiner — Danielle M. Christensen
(74) Attorney, Agent, or Firm — Neal, Gerber & Eisenberg LLP (57) ABSTRACT A wind turbine blade root having: an annular structure extending about a main axis and made of a composite material including a matrix and reinforcing fibers; first longitudinal reinforcing elements, which are incorporated in the annular structure, extend in the direction of the main axis, and are spaced apart in a circle about the main axis; and an annular reinforcing element connecting the first longitudinal reinforcing elements and having first coupling portions for connection to the first longitudinal reinforcing elements.

19 Claims, 10 Drawing Sheets (51) Int. Cl.
  *F03D 13/20*  (2016.01)
  *F03D 13/10*  (2016.01)
  *B29K 105/12* (2006.01)
  *B29K 305/00* (2006.01)

(52) U.S. Cl.
  CPC ............. *F03D 13/10* (2016.05); *F03D 13/20* (2016.05); *B29K 2105/12* (2013.01); *B29K 2305/00* (2013.01); *F05B 2260/301* (2013.01); *Y02E 10/721* (2013.01); *Y02P 70/523* (2015.11)

(58) Field of Classification Search
  CPC ............ B29D 99/0025; B29K 2305/00; B29K 2105/12; Y02P 70/523; Y02E 10/721; F05B 2260/301
  See application file for complete search history.

(56) References Cited

FOREIGN PATENT DOCUMENTS

| | | | |
|---|---|---|---|
| EP | 2532881 | 12/2012 | |
| JP | WO 2012111518 A1 * | 8/2012 | ........... F03D 1/0658 |
| WO | WO 2010/149806 | 12/2010 | |
| WO | WO 2012/140039 | 10/2012 | |

OTHER PUBLICATIONS

Notification Concerning Submission, Obtention or Transmittal of Priority Document (Form PCT/IB/304) for International Application No. PCT/IB2014/060142 dated May 16, 2014.

Notification of the Recording of a Change (Form PCT/IB/306) for International Application No. PCT/IB2014/060142 dated Mar. 31, 2015.

* cited by examiner

WIND TURBINE BLADE ROOT AND PROCESS FOR MANUFACTURING A WIND TURBINE BLADE ROOT

PRIORITY CLAIM

This application is a national stage application of PCT/IB2014/060142, filed on Mar. 25, 2014, which claims the benefit of and priority to Italian Patent Application No. MI2013A000449, filed on Mar. 25, 2013, the entire contents of which are each incorporated by reference herein.

BACKGROUND

Certain wind turbines are known to comprise a tower, a nacelle, a hub, and a plurality of blades. The nacelle typically houses an electric machine, and devices for controlling the wind turbine.

The nacelle is fitted to the tower to rotate about a substantially vertical axis, and supports the hub for rotation.

Each blade comprises a reinforcing beam, extending substantially the whole length of the blade, and a shell defining an airfoil. The shell is fixed to the reinforcing beam, and is usually made of composite material with a resin matrix reinforced with glass or carbon fibers.

The blades in turn are fitted to the hub in rotary manner, to enable adjusting the attack (or pitch) angle.

More specifically, the blades are connected to the hub by a blade roots, which substantially serves to transmit loads between the blade and the hub. Moreover, the connection of blade root to the hub by a bearing enables adjusting the orientation and pitch angle of the blade.

The blade root is normally an annular element, and may either be integral with the body of the blade or produced separately and joined to the blade body. The root and the blade body are made from the same composite material. The blade root, however, comprises longitudinal reinforcing elements to withstand the severe loads caused by the weight (several tons) and length (tens of meters) of the blade and prevent structural damage or severe deformation. More specifically, the blade root has an outer annular shell and inner annular shell, both made of composite material, and between which the longitudinal reinforcing elements are incorporated.

The blade root also comprises fasteners for connection to an outer metal ring, which may be a bearing race or a structural element in turn connected to the hub by a bearing.

According to one known solution, described in European Patent No EP 1633624 B1, threaded bushings tapering towards their distal end (with respect to the hub (i.e., towards the blade tip)) serve both as longitudinal reinforcing elements and as elements for fastening to an outer metal ring for connection to the hub. The bushings are fixed individually between the inner and outer annular shells, and are connected to a bearing on the hub by respective studs.

Known solutions are especially critical as regards transmitting severe loads between the blade body, the reinforcing elements, and the hub. That is, stress is transmitted to the blade via the longitudinal reinforcing elements, which only interact with one another via the annular shell material. This may therefore result in severely unbalanced load distribution, especially at certain angles during rotation. In the event of even microscopic defects, and at times even with a substantially sound structure, forces may concentrate to such an extent as to produce or propagate damage in the composite material.

SUMMARY

The present disclosure relates to a wind turbine blade root, and to a process configured to manufacture a wind turbine blade root.

It is an advantage of the present disclosure to provide a wind turbine blade root, and a process configured to manufacture a wind turbine blade root, configured to eliminate certain of the drawbacks described and, in particular, to improve load transmission.

According to the present disclosure, there is provided a wind turbine blade root comprising:
an annular structure extending about a main axis and made of a composite material including a matrix and reinforcing fibers;
first longitudinal reinforcing elements, which are incorporated in the annular structure, extend in the direction of the main axis and are spaced apart in a circle about the main axis; and
an annular reinforcing element connecting the first longitudinal reinforcing elements and having first coupling portions configured to couple to the first longitudinal reinforcing elements.

The annular reinforcing element serves to strengthen the blade root structure and distribute stress between the longitudinal reinforcing elements, thus preventing force concentrations, so load is transmitted more effectively between the blade body and the blade root reinforcing elements.

According to a further aspect of the disclosure, the annular reinforcing element has threaded holes, which alternate with the first coupling portions, have respective axes parallel to the main axis and are accessible from a proximal edge of the annular structure.

The threaded holes in the annular reinforcing element may be advantageously exploited to insert screws required for connection to the hub. Load is thus transmitted between the blade and the hub via the annular reinforcing element, as opposed to the longitudinal reinforcing elements, which serve to transmit load between the annular reinforcing element and the blade body. The connecting points being connected by the annular reinforcing element also assists in improving force distribution.

According to a further aspect of the disclosure, the blade root comprises second longitudinal reinforcing elements parallel to the main axis and arranged in a circle about the main axis, in angular positions corresponding to respective first longitudinal reinforcing elements; and the annular reinforcing element connects the second longitudinal reinforcing elements and comprises second coupling portions for connection to the second longitudinal reinforcing elements.

Using a second set of longitudinal reinforcing elements increases the area over which to transmit load to the composite-material structure. So the longitudinal reinforcing elements may be made smaller, while still ensuring gradual force transmission.

According to the present disclosure, there is also provided a process configured to manufacture a wind turbine blade root, the process comprising:
forming a first portion of a first annular layer of composite material about a main axis, the composite material comprising a matrix and reinforcing fibers;
placing first longitudinal reinforcing elements in the direction of the main axis and spaced apart in a circle on the first portion of the first annular layer; and connecting the first longitudinal reinforcing elements by a first portion of an annular reinforcing element having first coupling portions configured to couple to the first longitudinal reinforcing elements.

Additional features and advantages are described in, and will be apparent from the following Detailed Description and the figures.

BRIEF DESCRIPTION OF THE DRAWINGS

A number of non-limiting embodiments of the present disclosure will be described by way of example with reference to the attached drawings, in which.

DETAILED DESCRIPTION

Figure 1:
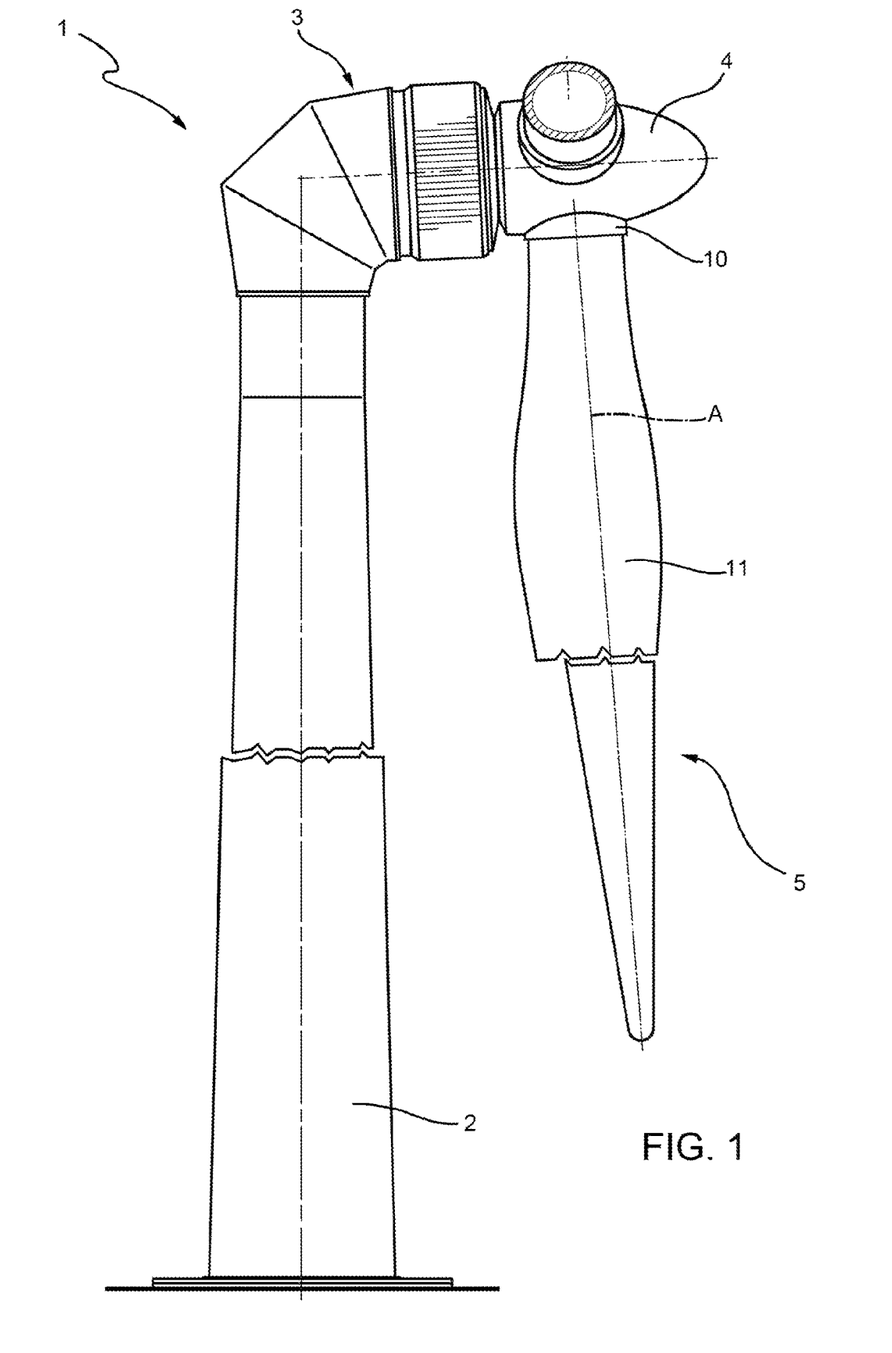
FIG. 1 shows a wind turbine.

Referring now to the example embodiments of the present disclosure illustrated in FIGS. 1 to 15, number 1 in FIG. 1 indicates as a whole a wind turbine. Wind turbine 1 comprises a tower 2, a nacelle 3, a hub 4, and a plurality of blades 5. Nacelle 3 houses an electric machine and devices configured to control wind turbine 1 (which are not shown for the sake of simplicity).

Blades 5 are fitted to hub 4, which in turn is fitted in rotary manner to nacelle 3.

Nacelle 3 is in turn fitted to tower 2 to rotate about a substantially vertical axis of rotation to position blades 5 into the wind. Each blade 5 can be adjusted about a respective longitudinal axis to a respective attack (pitch) angle with respect to the wind direction.

Each blade 5 comprises a blade root 10, to which are connected an aerodynamic shell 11 and an inner reinforcing beam (not shown in the drawings). Blade root 10 connects blade 5 to hub 4, and transmits loads between aerodynamic shell 11 and hub 4.

The blade root 10 of one of blades 5, to which reference is made hereinafter purely by way of example, is shown in more detail in FIGS. 2-5.

In the embodiment shown, blade root 10 comprises an annular structure 12 incorporating first longitudinal reinforcing elements 13 and second longitudinal reinforcing elements 14 mutually connected by a reinforcing ring 15.

Annular structure 12 extends about a main axis A, and is made of a composite material comprising a polymer matrix and reinforcing (e.g., glass or carbon) fibers.

Annular structure 12 comprises an outer annular shell 16 and inner annular shell 17, between which first longitudinal reinforcing elements 13 and second longitudinal reinforcing elements 14 are retained.

Figure 3:
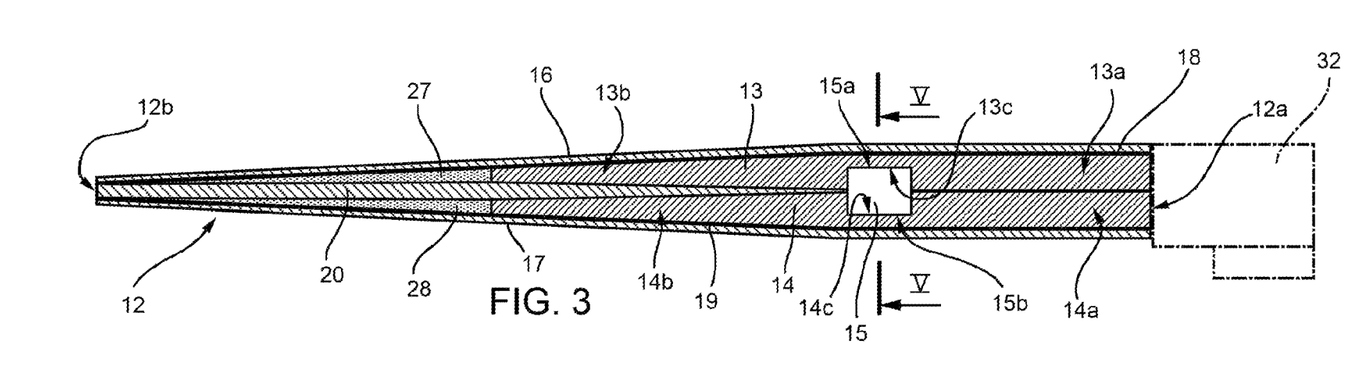
FIG. 3 shows a lateral section, along line III-III in FIG. 2, of the FIG. 2 blade root.
Figure 4:
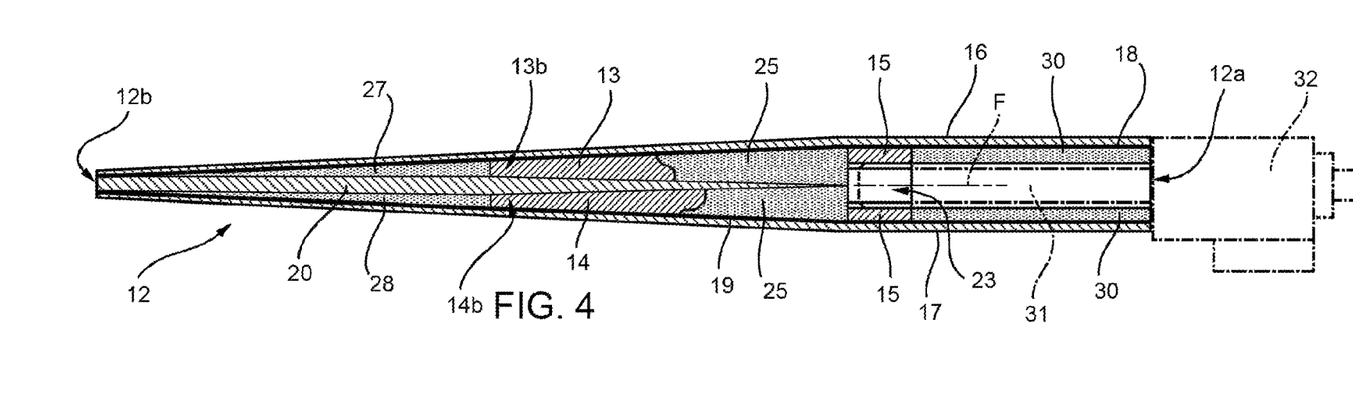
FIG. 4 shows a lateral section, along line IV-IV in FIG. 2, of the FIG. 2 blade root.

More specifically, first longitudinal reinforcing elements 13 and second longitudinal reinforcing elements 14 are made of metal or metal alloy (e.g., steel) and have respective substantially parallelepiped-shaped proximal ends 13a, 14a, and respective tapered (e.g., wedge-shaped) distal ends 13b, 14b.

Here and hereinafter, the terms 'proximal' and 'distal' with reference to parts of a generic element indicate parts located, in use, on the side of the element closer to the hub rotation axis, and on the side of the element further from the hub rotation axis and closer to the radially outer end of the blade, respectively.

First longitudinal reinforcing elements 13 are fixed to outer annular shell 16 by a first adhesive layer 18, extend in the direction of main axis A, and are spaced apart in a circle about main axis A. More specifically, the proximal ends 13a of first longitudinal reinforcing elements 13 are located close to a proximal edge 12a of annular structure 12.

Similarly, second longitudinal reinforcing elements 14 are fixed to inner annular shell 17 by a second adhesive layer 19, extend in the direction of main axis A, and are also spaced apart in a circle, with respective proximal ends 14a located close to proximal edge 12a of annular structure 12. Moreover, second longitudinal reinforcing elements 14 are located in angular positions corresponding to and radially inwards of respective first longitudinal reinforcing elements 13.

The proximal ends 13a, 14a of first longitudinal reinforcing elements 13 and corresponding second longitudinal reinforcing elements 14 contact one another along respective faces. Whereas the distal ends 13b, 14b of first longitudinal reinforcing elements 13 and corresponding second longitudinal reinforcing elements 14 are separated by an intermediate layer 20 of annular structure 12, also made of composite material. Intermediate layer 20 is clamped between first longitudinal reinforcing elements 13 and second longitudinal reinforcing elements 14 by the composite material setting. In an embodiment (not shown in the drawings), however, first longitudinal reinforcing elements 13 and corresponding second longitudinal reinforcing elements 14 are also gripped together by screw fasteners.

Reinforcing ring 15 is made of metal or metal alloy (e.g., steel) and may either be formed in one piece or comprise two or more ring portions joined to one another.

Figure 5:
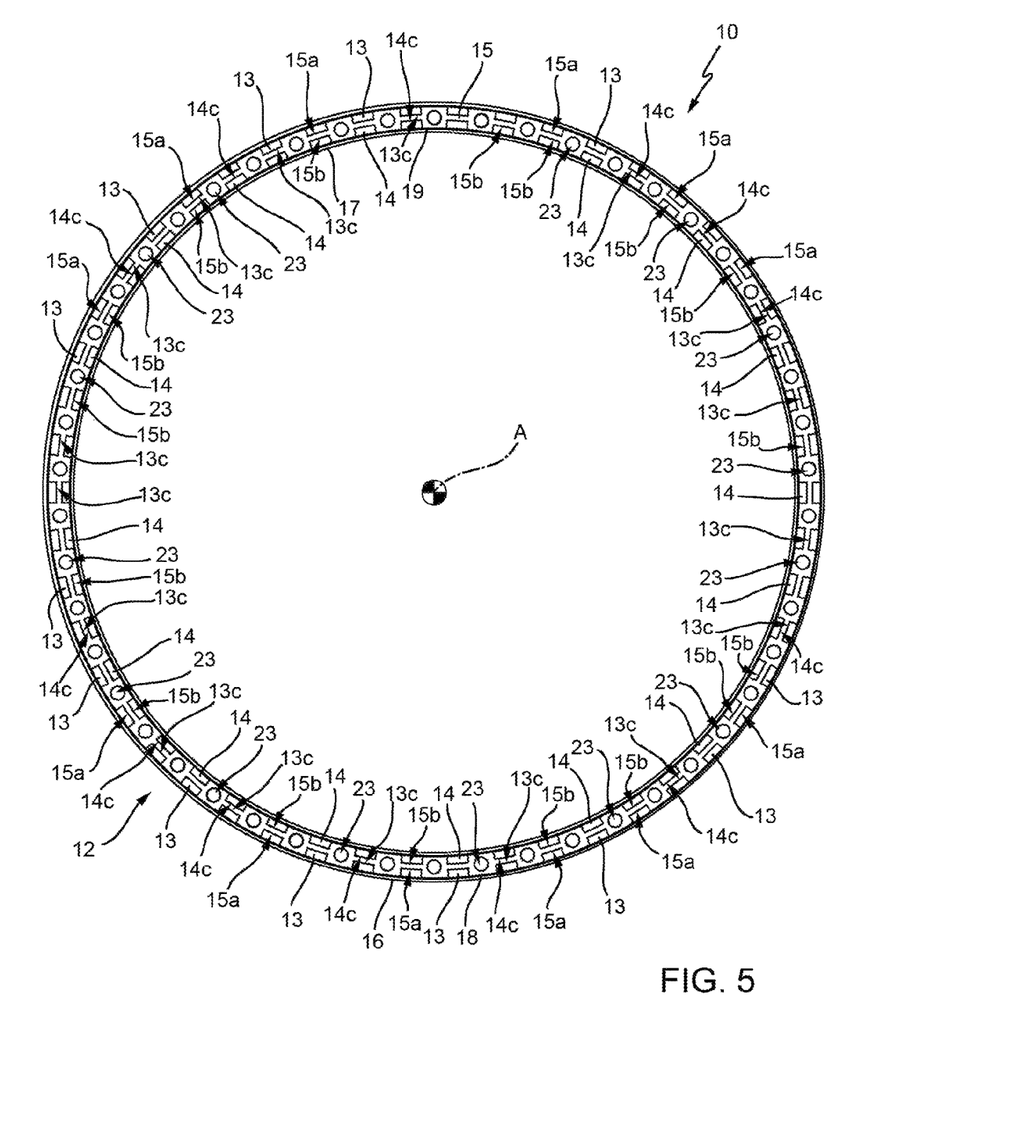
FIG. 5 shows a front section, along line V-V in FIG. 3, of the FIG. 2 blade root.

Reinforcing ring 15 connects first longitudinal reinforcing elements 13 and second longitudinal reinforcing elements 14 to one another. More specifically, reinforcing ring 15 has first coupling portions 15a configured to couple to first longitudinal reinforcing elements 13, and second coupling portions 15b configured to couple to second longitudinal reinforcing elements 14. First coupling portions 15a are defined by respective longitudinal slots in an outer face of the reinforcing ring. First coupling portions 15a extend from one side to the other of reinforcing ring 15, between flat opposite faces thereof, in a direction parallel to main axis A, and are the same width as first longitudinal reinforcing elements 13. Second coupling portions 15b are defined by respective longitudinal slots in an inner face of reinforcing ring 15, and in angular positions corresponding to respective first coupling portions 15a. Like these, second coupling portions 15b extend from one side to the other of reinforcing ring 15, between flat opposite faces thereof, in a direction parallel to main axis A, and are the same width as second longitudinal reinforcing elements 14.

First longitudinal reinforcing elements 13 and second longitudinal reinforcing elements 14 have respective first transverse slots 13c and second transverse slots 14c, in intermediate portions between respective proximal ends 13a, 14a and distal ends 13b, 14b. First transverse slots 13c and second transverse slots 14c are of a width equal to the thickness of reinforcing ring 15, and have profiles matching up with first coupling portions 15a and second coupling portions 15b respectively.

Reinforcing ring 15 is joint-connected to first longitudinal reinforcing elements 13 and second longitudinal reinforcing elements 14.

Figure 2:
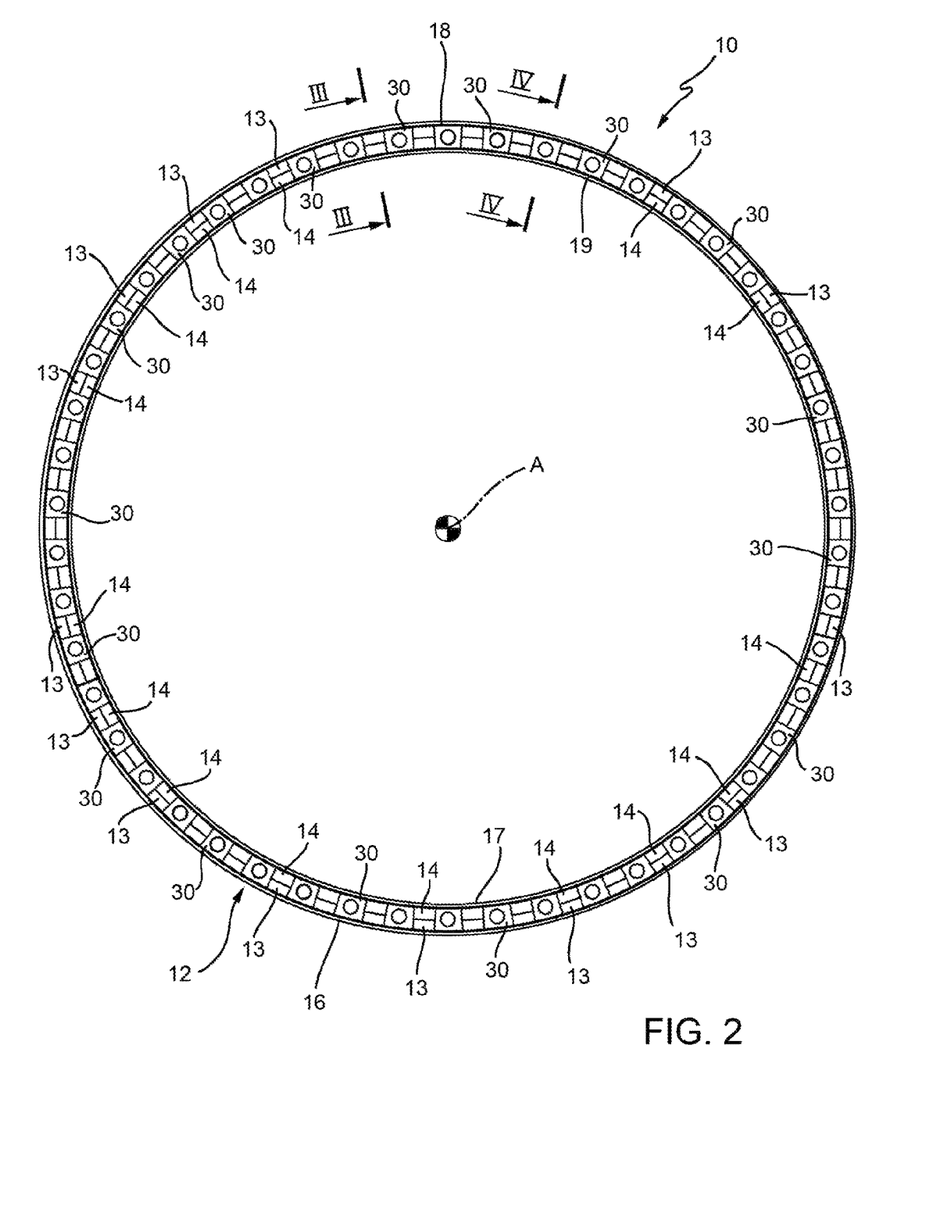
FIG. 2 shows a front view of a wind turbine blade root in accordance with one embodiment of the present disclosure and incorporated in the FIG. 1 wind turbine.

Reinforcing ring 15 also has threaded holes 23 alternating with first coupling portions 15a and second coupling portions 15b, and having respective axes F parallel to main axis A. In other words, the portions of reinforcing ring 15 in which threaded holes 23 are formed are located in gaps between circumferentially pairs of adjacent first longitudinal reinforcing elements 13 and second longitudinal reinforcing elements 14.

The distal ends 13b, 14b of first longitudinal reinforcing elements 13 and second longitudinal reinforcing elements 14 are separated circumferentially by fillers 25 (e.g., foam material). An outer spacer ring 27 and inner spacer ring 28, also made of foam material, are located radially between intermediate layer 20 and outer annular shell 16, and between intermediate layer 20 and inner annular shell 17, respectively. Outer spacer ring 27 and inner spacer ring 28 extend axially between the distal ends 13b, 14b of first longitudinal reinforcing elements 13 and second longitudinal reinforcing elements 14 and a distal edge 12b of annular structure 12.

Spacers 30 with holes are located between the proximal ends 13a, 14a of first longitudinal reinforcing elements 13 and second longitudinal reinforcing elements 14, and extend axially between the proximal edge 12a of annular structure 12 and reinforcing ring 15. The holes enable for inserting studs 31 inside respective threaded holes 23 to fix blade root 10 to a race of a bearing 32 (indicated by the dash-and-dot line in FIGS. 3 and 4) for connection to hub 4 of wind turbine 1.

The structure of blade root 10—with reinforcing ring 15 with threaded holes 23 for connection to the hub, and which connects all of longitudinal reinforcing elements 13, 14 to one another—provides for safely, or at least relatively more safely, transmitting loads between hub 4 and each blade 5. It should be appreciated that the elements first involved are reinforcing ring 15 on the blade 5 side, and the studs on the hub 4 side. Reinforcing ring 15 aids in strengthening the blade root structure and in distributing load more evenly by also exploiting the connection to longitudinal reinforcing elements 13, 14.

Moreover, longitudinal reinforcing elements 13, 14, being arranged in two sets, may advantageously be made smaller.

It should be appreciated that providing two sets of longitudinal reinforcing elements, however, is not essential.

In the FIG. 6-9 embodiment, a blade root 110 of a wind turbine blade (neither shown as a whole) comprises an annular structure 112 incorporating longitudinal reinforcing elements 113 connected to one another by a reinforcing ring 115.

Annular structure 112 extends about a main axis A', and is made of a composite material comprising a polymer matrix and reinforcing (e.g., glass or carbon) fibers.

Figure 7:
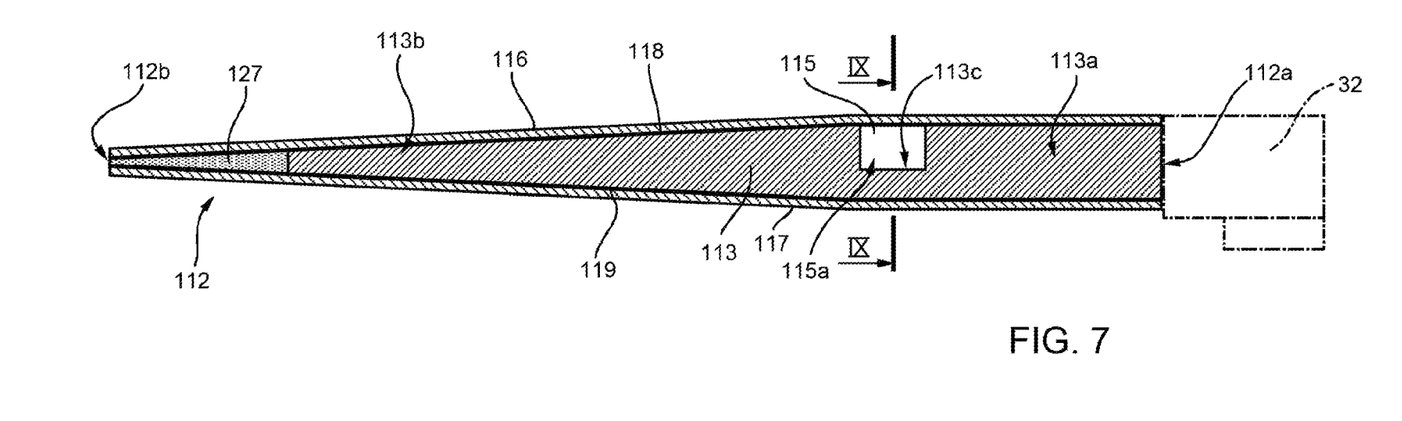
FIG. 7 shows a lateral section, along line VII-VII in FIG. 6, of the FIG. 6 blade root.
Figure 8:
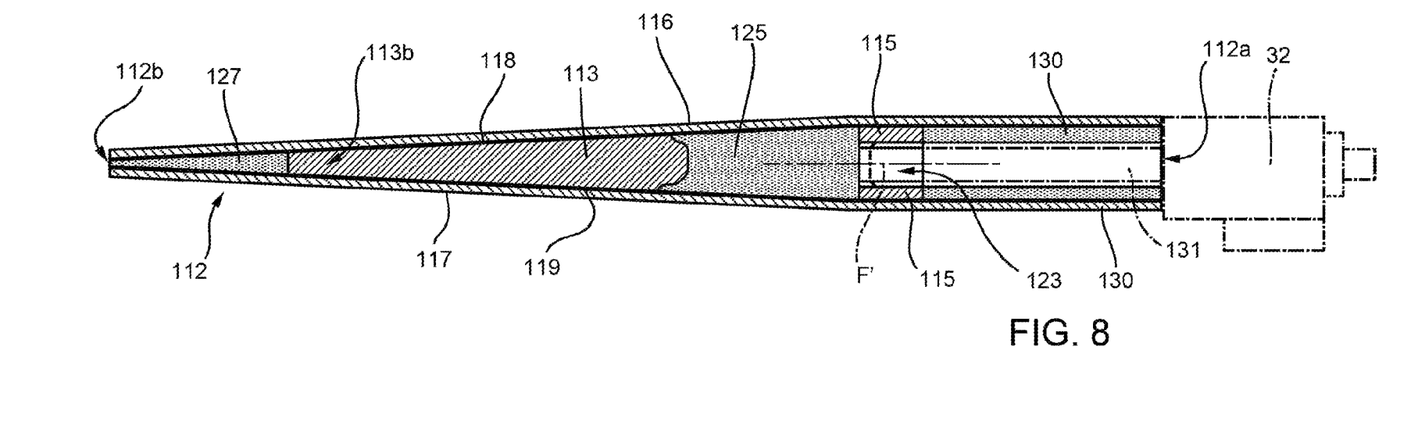
FIG. 8 shows a lateral section, along line VIII-VIII in FIG. 6, of the FIG. 6 blade root.

Annular structure 112 comprises an outer annular shell 116 and inner annular shell 117, between which longitudinal reinforcing elements 113 are retained.

Longitudinal reinforcing elements 113 are made of metal or metal alloy (e.g., steel) and have respective parallelepiped-shaped proximal ends 113a, and respective tapered (e.g., wedge-shaped) distal ends 113b.

Longitudinal reinforcing elements 113 are fixed to outer annular shell 116 by a first adhesive layer 118 and to inner annular shell 117 by a second adhesive layer 119, extend in the direction of main axis A', and are spaced apart in a circle about main axis A'. More specifically, the proximal ends 113a of longitudinal reinforcing elements 113 are located close to a proximal edge 112a of annular structure 112.

Figure 9:
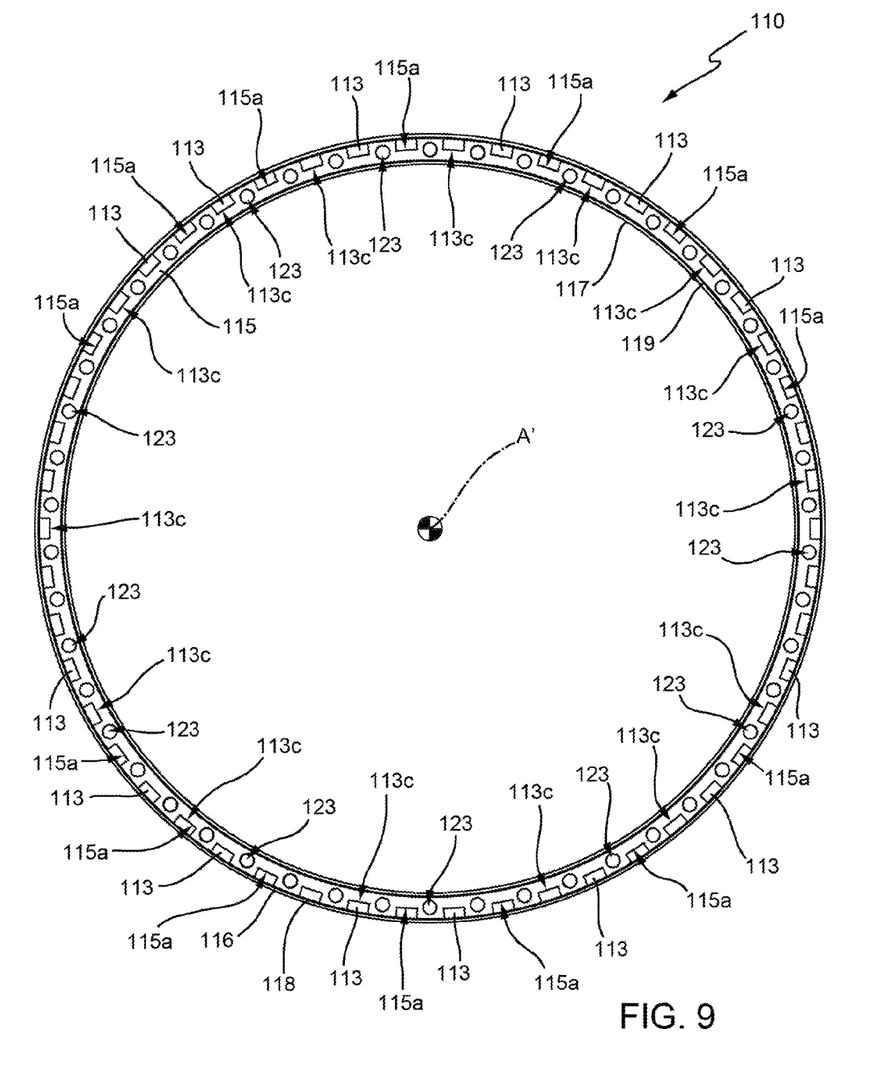
FIG. 9 shows a front section, along line IX-IX in FIG. 7, of the FIG. 6 blade root.

Reinforcing ring 115, which is made of metal or metal alloy (e.g., steel) connects longitudinal reinforcing elements 113 to one another. More specifically, reinforcing ring 115 has coupling portions 115a defined by respective longitudinal slots in an outer face of the reinforcing ring. Coupling portions 115a extend from one side to the other of reinforcing ring 115, between flat opposite faces thereof, in a direction parallel to main axis A', and are the same width as longitudinal reinforcing elements 113.

Longitudinal reinforcing elements 113 have respective transverse slots 113c in intermediate portions between respective proximal ends 113a and distal ends 113b. Transverse slots 113c are of a width equal to the thickness of reinforcing ring 115, and have profiles matching up with respective coupling portions 115a.

Coupling between reinforcing ring 115 and longitudinal reinforcing elements 113 is obtained by shape or joint.

Figure 6:
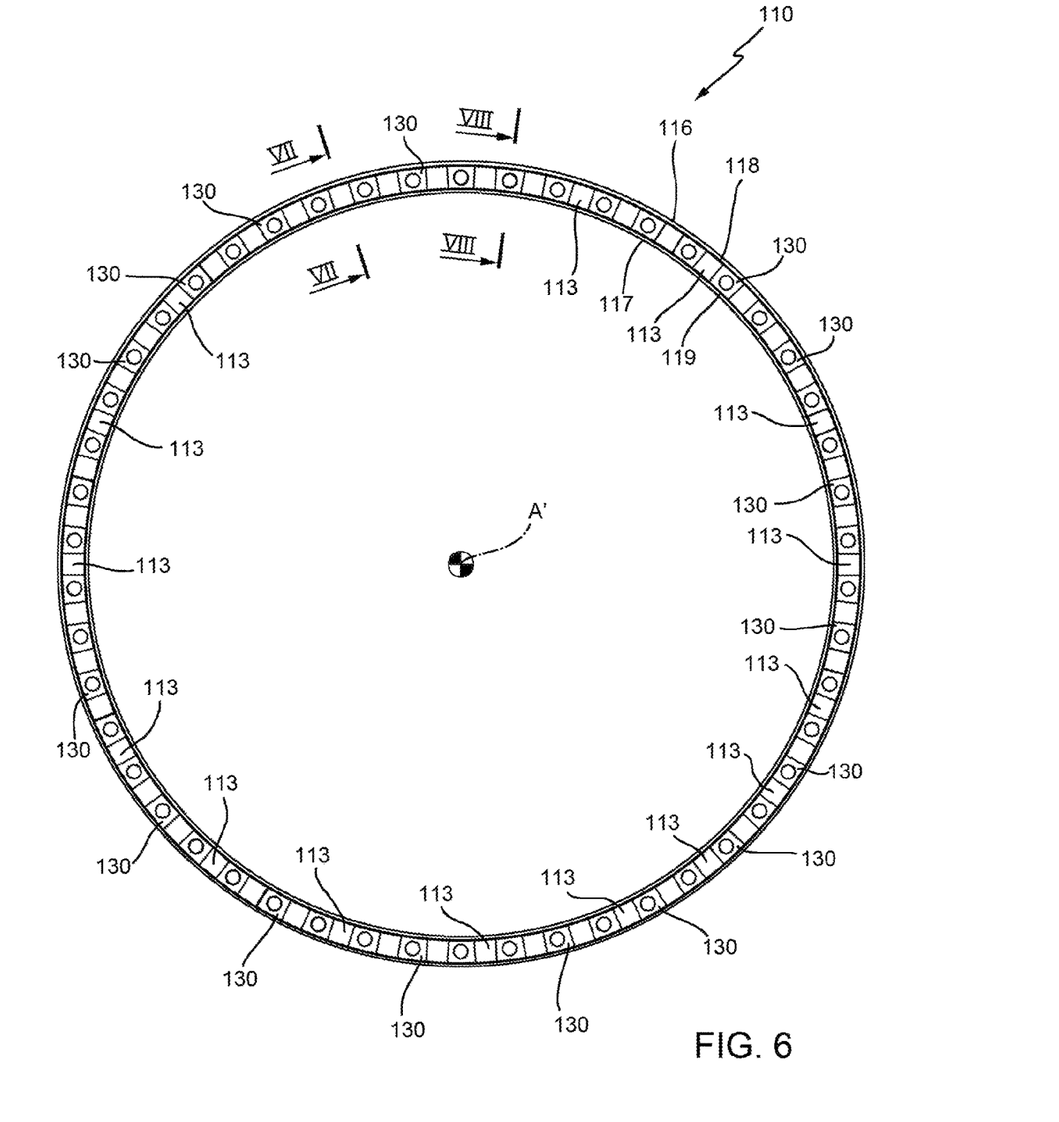
FIG. 6 shows a front view of a wind turbine blade root in accordance with a different embodiment of the present disclosure.

Reinforcing ring 115 also has threaded holes 123 alternating with coupling portions 115a and having respective axes F' parallel to main axis A'. In other words, the portions of reinforcing ring 115 in which threaded holes 123 are formed are located in gaps between circumferentially adjacent longitudinal reinforcing elements 113.

The distal ends 113b of longitudinal reinforcing elements 113 are separated circumferentially by fillers 125 (e.g., foam material). A spacer ring 127, also made of foam material, is located radially between outer annular shell 116 and inner annular shell 117, and extends axially between the distal ends 113b of longitudinal reinforcing elements 113 and a distal edge 112b of annular structure 112.

Spacers 130 with holes are located between the proximal ends 113a of longitudinal reinforcing elements 113, and extend axially between the proximal edge 112a of annular structure 112 and reinforcing ring 115. The holes enable for inserting studs 131 inside respective threaded holes 123 to fix blade root 110 to a race of a bearing 132 (indicated by the dash-and-dot line in FIGS. 7 and 8) for connection to a wind turbine hub.

FIGS. 10-14 show a process configured to manufacture the blade root 10 in FIGS. 2-5. In one embodiment of the disclosure, blade root 10 is produced separately in two substantially identical halves which are ultimately joined together. In what follows, the process will be description in detail in relation to only one of the two halves and will be briefly summarized for the other half. It is understood, however, that what is described and illustrated also applies, with no major differences, to both halves of blade root 10.

Firstly (FIG. 10), prepreg sheets (i.e., sheets of composite material with fibers preimpregnated with partly polymerized resin) are conformably placed inside a semicylindrical female mold (not shown in the drawings) to form a first outer half-shell 16' eventually forming part of outer annular shell 16. In the following description, reference is consistently made to the use of prepreg sheets, this should in no way be inferred as limiting, in that the same result may be achieved by laying layers of non-impregnated reinforcing fibers, and then infusing resin to form the composite material matrix.

Figure 10:
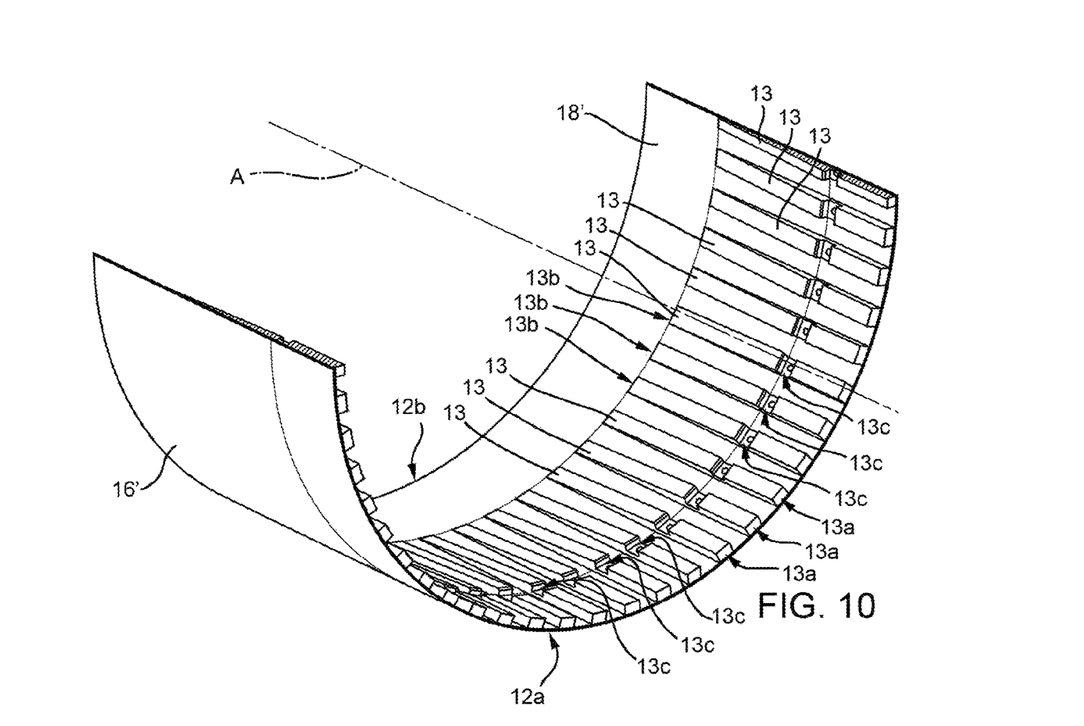
FIG. 10 shows a view in perspective of a first portion of the FIG. 2 blade root at an initial stage in a manufacturing process in accordance with one embodiment of the present disclosure.

A first adhesive layer 18' is laminated onto first outer half-shell 16'. And a first set of first longitudinal reinforcing elements 13 is then placed on first adhesive layer 18' to fix them to first outer half-shell 16'. More specifically, first longitudinal reinforcing elements 13 are laid in the direction of main axis A and spaced apart in a circle on first outer half-shell 16'.

Figure 11:
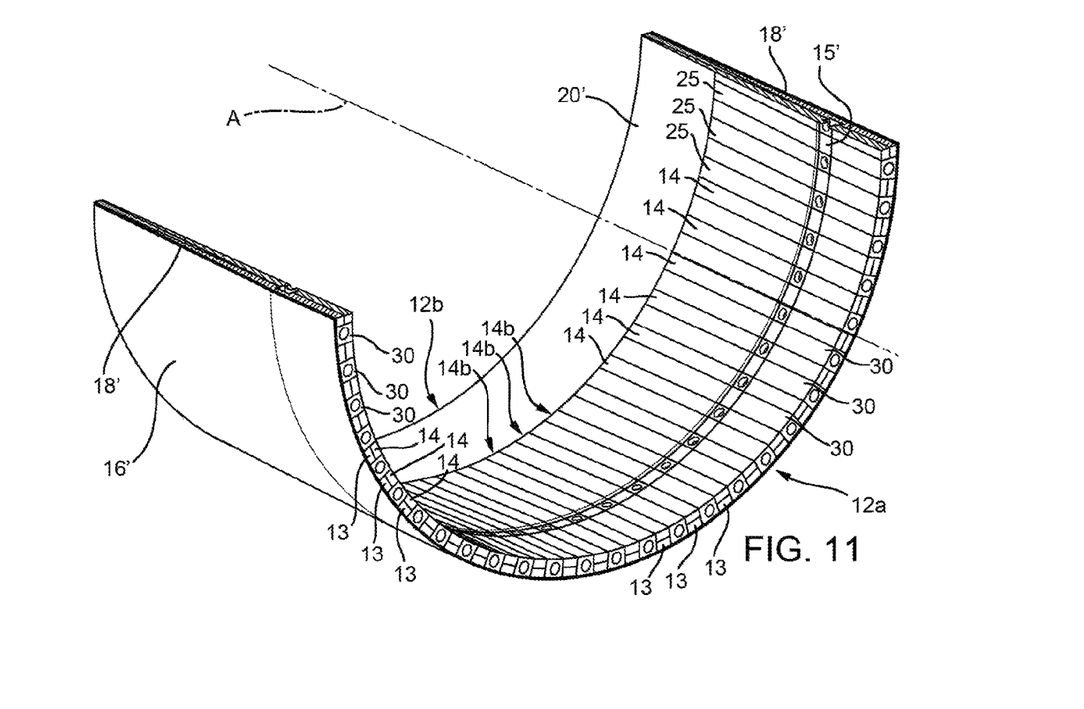
FIGS. 11 and 12 show views in perspective of the FIG. 10 blade portion at successive stages of the process.

As shown in FIG. 11, a first reinforcing half-ring 15', ultimately forming part of reinforcing ring 15, is placed so that first coupling portions 15a engage respective first transverse slots 13c in first longitudinal reinforcing elements 13 (see also FIG. 5), first reinforcing half-ring 15' thus connects first longitudinal reinforcing elements 13, and the threaded holes 23 in first reinforcing half-ring 15' are located in the gaps between adjacent first longitudinal reinforcing elements 13.

Next, fillers 25 (not shown here—see FIGS. 3 and 4) are inserted between the distal ends 13b of adjacent first longitudinal reinforcing elements 13, and a first outer half-spacer-ring is inserted between first longitudinal reinforcing elements 13 and the distal edge of first outer half-shell 16' to form an even, seamless surface.

After a layer of adhesive (not shown for the sake of simplicity) is laminated on, prepreg sheets are conformably deposited to form a first portion 20' of intermediate layer 20. The first portion 20' of intermediate layer 20 extends between first reinforcing half-ring 15' and the distal edge of first outer half-shell 16'.

Another adhesive layer (not shown in the drawings) is laminated onto first portion 20' of intermediate layer 20, and a first set of second longitudinal reinforcing elements 14 is fixed to first portion 20'. More specifically, second longitudinal reinforcing elements 14 are placed in angular positions corresponding to respective first longitudinal reinforcing elements 13, and so that second coupling portions 15b of first reinforcing half-ring 15' engage respective second transverse slots 14c (see also FIG. 5).

Further fillers 25, spacers 30 with holes, and a first inner half-spacer-ring (not shown in the drawings) are then positioned to form an even, seamless surface.

Figure 12:
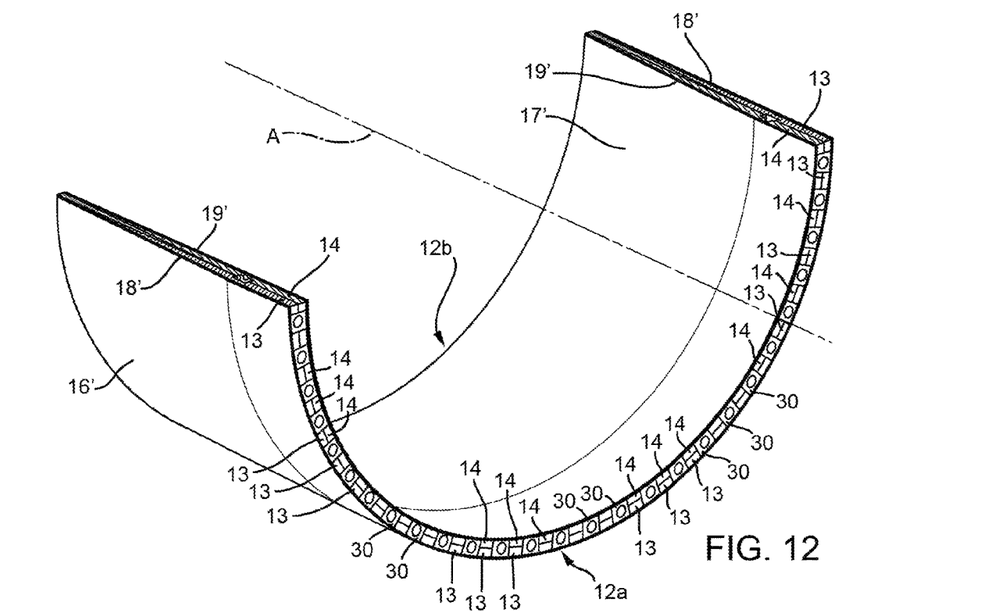
Figure 13:
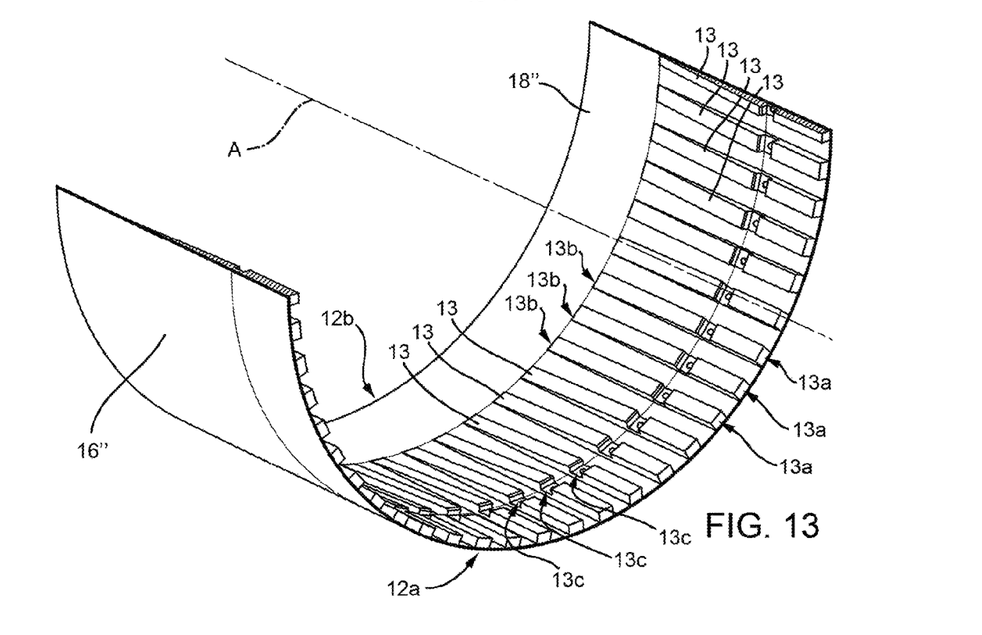
FIG. 13 shows a view in perspective of a second portion of the FIG. 2 blade root at one stage of the process.
Figure 14:
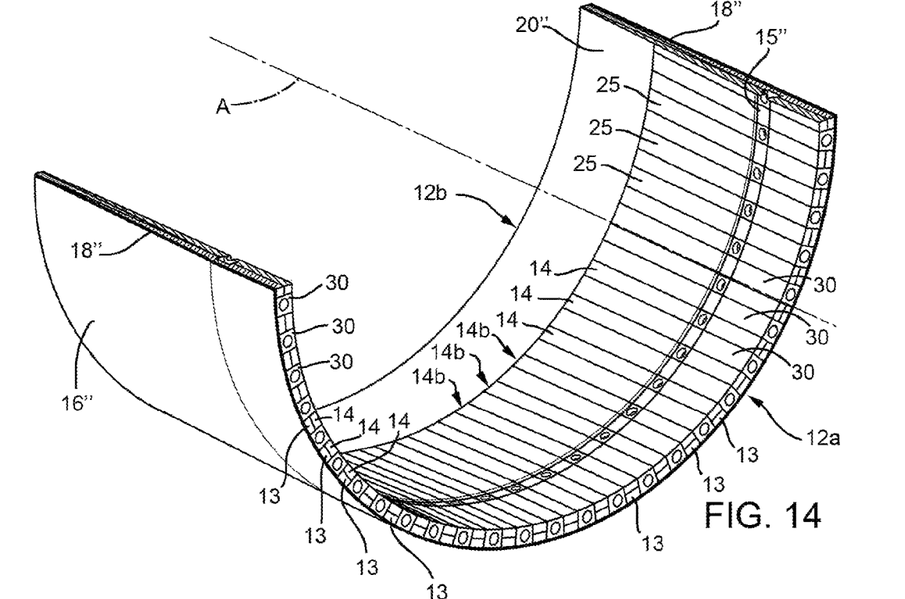
FIGS. 14 and 15 show views in perspective of the FIG. 13 blade portion at successive stages of the process.

Further prepreg sheets are then deposited to form a first inner half-shell 17' and so complete the first half of blade root 10 (FIG. 12).

Figure 15:
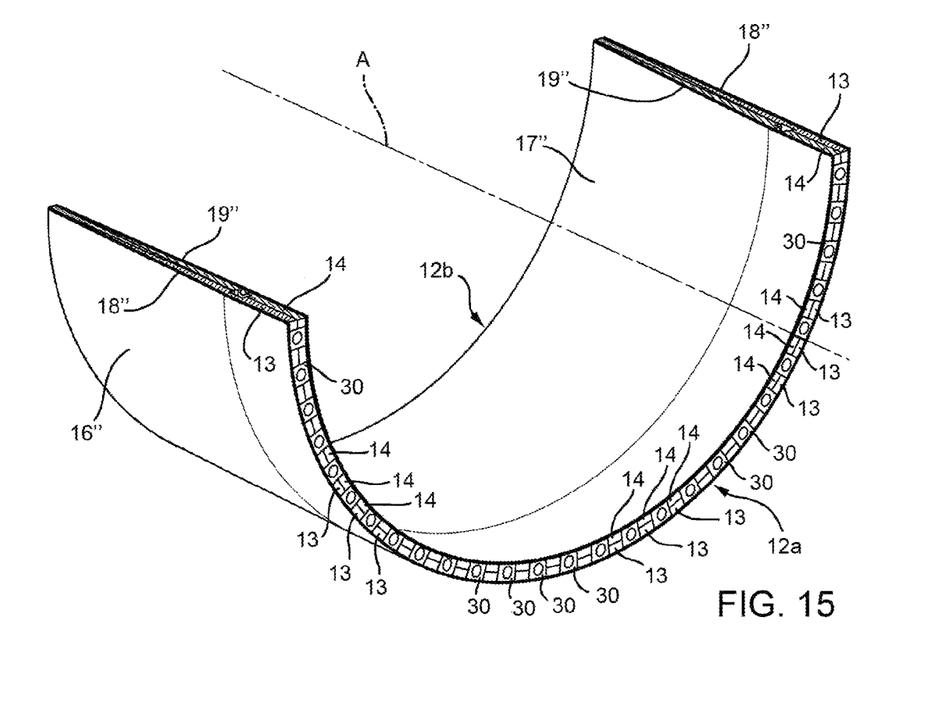

The second half is made in exactly the same way, by:
forming a second outer half-shell 16" (FIG. 13);
laying a second set of first longitudinal reinforcing elements 13 on second outer half-shell 16";
connecting the first longitudinal reinforcing elements 13 with a second reinforcing half-ring 15" (FIGS. 14 and 5);
assembling a second inner half-spacer-ring and further fillers 25 (not shown in the drawings);
forming a second portion 20" of intermediate layer 20;
laying a second set of second longitudinal reinforcing elements 14 on second portion 20" of intermediate layer 20;
assembling a second inner half-spacer-ring (not shown in the drawings), further fillers 25, and spacers 30 with holes; and
forming a second inner half-shell 17" (FIG. 15).

The two halves so formed are then joined to form blade root 10.

Blade root 10 is then vacuum hardened in conventional manner. Alternatively, the two halves of blade root 10 may be hardened before they are joined.

Blade 5 is completed by incorporating blade root 10 and is fixed to a bearing 32 of hub 4 by studs 31 inserted inside through holes 23.

Clearly, changes may be made to the blade root and process described without, however, departing from the scope of the present disclosure as defined in the accompanying Claims. That is, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A wind turbine blade root comprising:
an annular structure extending about a main axis and including a first annular shell, and a first adhesive layer, said annular structure being made of a composite material including a matrix and a plurality of reinforcing fibers;
a plurality of first longitudinal reinforcing elements incorporated in the annular structure, said plurality of first longitudinal reinforcing elements extending in a direction of the main axis and being spaced apart about the main axis, wherein the first adhesive layer of the annular structure is between the first annular shell of the annular structure and the plurality of first longitudinal reinforcing elements;
an annular reinforcing element connecting the plurality of first longitudinal reinforcing elements, said annular reinforcing element having a plurality of first coupling portions configured to couple to the plurality of first longitudinal reinforcing elements; and
a plurality of second longitudinal reinforcing elements extending in the direction of the main axis, said plurality of second longitudinal reinforcing elements being arranged about the main axis in a plurality of angular positions respectively corresponding to the plurality of first longitudinal reinforcing elements, wherein the annular reinforcing element connects the plurality of second longitudinal reinforcing elements and includes a plurality of second coupling portions for connection to the plurality of second longitudinal reinforcing elements.

2. The wind turbine blade root of claim 1, wherein the annular structure includes:
a second annular shell, and
a second adhesive layer between the second annular shell and the plurality of second longitudinal reinforcing elements.

3. The wind turbine blade root of claim 1, wherein:
the plurality of second coupling portions define a plurality of second longitudinal slots of a size corresponding to a transverse dimension of the plurality of second longitudinal reinforcing elements, and
the plurality of second longitudinal reinforcing elements define a plurality of second transverse slots which respectively receive the plurality of second coupling portions of the annular reinforcing element.

4. The wind turbine blade root of claim 1, wherein each of the plurality of second longitudinal reinforcing elements has a tapered distal end.

5. The wind turbine blade root of claim 1, wherein the plurality of second coupling portions are arranged in angular positions respectively corresponding to the plurality of first coupling portions.

6. The wind turbine blade root of claim 5, wherein the plurality of first coupling portions and the plurality of second coupling portions are located on respective radially opposite faces of the annular reinforcing element.

7. The wind turbine blade root of claim 1, wherein an intermediate layer of the composite material is clamped between the plurality of first longitudinal reinforcing elements and the plurality of second longitudinal reinforcing elements.

8. The wind turbine blade root of claim 1, wherein the plurality of second longitudinal reinforcing elements are arranged in a circle about the main axis.

9. The wind turbine blade root of claim 1, wherein each of the first longitudinal reinforcing elements has a tapered distal end.

10. The wind turbine blade root of claim 1, wherein the annular reinforcing element includes at least a first annular portion and a second annular portion joined to each other.

11. The wind turbine blade root of claim 1, wherein said plurality of first longitudinal reinforcing elements are spaced apart in a circle about the main axis.

12. A wind turbine blade root comprising:
an annular structure extending about a main axis, said annular structure being made of a composite material including a matrix and a plurality of reinforcing fibers;
a plurality of first longitudinal reinforcing elements incorporated in the annular structure, said plurality of first longitudinal reinforcing elements extending in a direction of the main axis and being spaced apart about the main axis; and
an annular reinforcing element connecting the plurality of first longitudinal reinforcing elements, said annular reinforcing element having:
a plurality of first coupling portions configured to couple to the plurality of first longitudinal reinforcing elements, and
a plurality of threaded holes, which:
(i) alternate with the plurality of first coupling portions,
(ii) have respective axes parallel to the main axis, and
(iii) are accessible from a proximal edge of the annular structure.

13. The wind turbine blade root of claim 12, wherein each of the first longitudinal reinforcing elements has a tapered distal end.

14. The wind turbine blade root of claim 12, wherein the annular reinforcing element includes at least a first annular portion and a second annular portion joined to each other.

15. The wind turbine blade root of claim 12, wherein said plurality of first longitudinal reinforcing elements are spaced apart in a circle about the main axis.

16. A wind turbine blade root comprising:
an annular structure extending about a main axis, said annular structure being made of a composite material including a matrix and a plurality of reinforcing fibers;
a plurality of first longitudinal reinforcing elements incorporated in the annular structure and defining a plurality of first transverse slots, said plurality of first longitudinal reinforcing elements extending in a direction of the main axis and being spaced apart about the main axis; and
an annular reinforcing element connecting the plurality of first longitudinal reinforcing elements, said annular reinforcing element having a plurality of first coupling portions configured to couple to the plurality of first longitudinal reinforcing elements, wherein the plurality of first coupling portions define a plurality of first longitudinal slots of a width corresponding to a transverse dimension of the plurality of first longitudinal reinforcing elements and the defined plurality of first transverse slots respectively receive the plurality of first coupling portions of the annular reinforcing element.

17. The wind turbine blade root of claim 16, wherein each of the first longitudinal reinforcing elements has a tapered distal end.

18. The wind turbine blade root or claim 16, wherein the annular reinforcing element includes at least a first annular portion and a second annular portion joined to each other.

19. The wind turbine blade root of claim 16, wherein said plurality of first longitudinal reinforcing elements are spaced apart in a circle about the main axis.

* * * * *